(12) United States Patent
Bocquier

(10) Patent No.: US 7,992,521 B2
(45) Date of Patent: Aug. 9, 2011

(54) METHOD AND DEVICE FOR AUTOMATICALLY DETECTING MATING OF ANIMALS

(75) Inventor: François Bocquier, Saint Gely du Fesc (FR)

(73) Assignees: Centre International d'Etudes Superieures en Sciences Agronomiques de Montepelliar (Montepellier Supagro), Montpellier (FR); Institut National de la Recherche Agronomique (I.N.R.A.), Paris (FR)

( * ) Notice: Subject to any disclaimer, the term of this patent is extended or adjusted under 35 U.S.C. 154(b) by 483 days.

(21) Appl. No.: 10/583,499

(22) PCT Filed: Dec. 20, 2004

(86) PCT No.: PCT/EP2004/053598
§ 371 (c)(1),
(2), (4) Date: Jun. 15, 2007

(87) PCT Pub. No.: WO2005/065574
PCT Pub. Date: Jul. 21, 2005

(65) Prior Publication Data
US 2008/0066693 A1    Mar. 20, 2008

(30) Foreign Application Priority Data
Dec. 19, 2003 (FR) ..................... 03 14970

(51) Int. Cl.
*A01K 29/00* (2006.01)

(52) U.S. Cl. ........................ 119/174; 600/587
(58) Field of Classification Search ............. 119/854, 119/855, 838, 174; 600/591, 587
See application file for complete search history.

(56) References Cited

U.S. PATENT DOCUMENTS

| | | | | |
|---|---|---|---|---|
| 3,824,989 A * | 7/1974 | Horner et al. | ................. | 600/551 |
| 3,844,273 A * | 10/1974 | Polson | ........................ | 600/551 |
| 4,503,808 A * | 3/1985 | McAlister | .................... | 600/551 |
| 4,895,165 A * | 1/1990 | Blair | ............................ | 600/551 |
| 5,542,431 A * | 8/1996 | Starzl et al. | ................... | 600/551 |

* cited by examiner

*Primary Examiner* — Rob Swiatek
*Assistant Examiner* — Kristen C Hayes
(74) *Attorney, Agent, or Firm* — Young & Thompson

(57) ABSTRACT

The inventive device for automatically detecting the mating of animals is wearable by an animal. The device includes a fixing to an animal mechanism, a detector for an attempt of mating a female animal by the animal with the fixing mechanism, and an identifier for an electronic label which is introduced in the body of the female animal and actuated by the detector and/or by the female animal identification device by processing the image of at least one part of the female animal triggered by the detector. The identifier includes a communicator with an electronic label carried by a female animal. The communicator can read the electronic label identifier of each female animal which the animal attempts to mate. The communication can also be provided with a device for storing representative information on the attempted mating in the random access memory of the electronic label.

20 Claims, 12 Drawing Sheets

METHOD AND DEVICE FOR AUTOMATICALLY DETECTING MATING OF ANIMALS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention concerns a process and device for the computerized detection of mountings among animals. It applies, in particular, to the detection of the fertility period of livestock.

BACKGROUND OF THE INVENTION

The successful reproduction of farm animals is fundamental for the productivity of livestock because it directly determines the birth of the young intended for meat production and, indirectly, the beginning of a lactation period which is prolonged by milking milk-producing animals.

Among these animals, the females accept being mounted only when they are in heat (oestrus), i.e., during a very short period (between 36 and 48 hours) of their reproductive cycle which lasts from 17 days (ovines) to 21 days (bovines and goats). The expression of this oestrus is more or less clear, depending on the species: undetectable in the absence of males among ovines and goats and noticeable among bovines because of the fact that the cow in heat allows herself to be mounted by others and shows signs of excitement. Reproduction is also a key step in genetic improvement of animals since females can be artificially inseminated with sperm from animals considered to be improving the breed. However, these inseminations must be carried out at a precise moment in relation to the appearance of heat among these females.

For the detection of the heat condition, in most cases, the stock-breeders rely on the observation of the cows but the rate of detection is low, because cows exhibit their heat condition more during the night time hours than during the day. As far as small ruminants are concerned, at present the only solution to perform artificial insemination relies on inducing heat in the females by hormonal treatments and programmed insemination. The use of hormonal treatments is limited with bovines. These days, on account of the principle of precaution demanded by consumers, one must seriously consider that the use of hormonal treatments in order to induce the fertility cycle among livestock, may become heavily regulated. If this possibility were to become reality, it would be virtually impossible to carry out inseminations on a large scale among small ruminants. In effect, considering the size of the herds (frequently 300 to 600 head), it is not feasible to detect oestrus by observing, several times each day, the behavior of the males in the herd. The same problem arises for bovines for which the number of heads per herd are increasing noticeably. There is thus a need to automate the detection of females in heat in large herds, either to achieve a greater number of natural couplings with a record of paternity, or for artificial insemination.

At present there are devices for detecting the females in heat which rely on measuring the agitation of cows (pedometers distributed by AlfaLaval [in France]) and on the analysis of variations in milk production and/or of milk characteristics (pH). Other systems, which are much more cumbersome consist of video monitoring of an area set aside for animals susceptible to come into heat.

These systems are costly, and their setup is complicated. Actually they require regular visual surveillance by an observer or a biochemical analysis, and they are liable to falsely identify females in heat.

There are other electronic devices for detecting females in heat which are exclusively used for bovines. These are pressure detectors that are temporarily attached on the cow's rump. Being mounted by another cow (which is not so equipped and which can be any cow) triggers a signal which is recorded in the device. In the case of the DEC ([electronic heat detection] system which features a visual alarm and which is sold by IMV France) the frequency at which the LED worn by the cow flashes, indicates the intensity and the frequency of the mountings and allows the stock-breeder to decide whether insemination should be done. Another system exists (known under the name of HEATWATCH (™), registered trade name, USA) which relies on the same principle, but each time the cow is mounted, her device sends data to a wireless access point which relays this signal to a computer. The cow can be identified by her number which is manually entered when the device is installed. Another more recent system uses 78 radio channels to identify the cows that are being mounted (this does not represent the official number of the animal, but a temporarily assigned number, in difference to the HeatWatch system).

All these systems are costly and their installation is complex. All females must be successively and temporarily equipped so their period in heat can be detected.

In general, all existing detectors make use of female-female behavior which are much less selective than the male-female behavior. As a matter of fact, the cows in heat accept being mounted, but they also try to mount the other cows (not in heat). This weak selectivity of cow-cow relations leads to a high number of false positives.

The present invention aims to remedy these inconveniences.

BRIEF SUMMARY OF THE INVENTION

For this purpose the present invention aims, according to a first aspect, at a device for the automated detection of mountings among animals, intended to be worn by an animal, characterized by the fact that it includes:
  a means for attaching it on said male animal,
  a means for detecting an attempt of said animal to mount a female animal, and
  a means for identifying an electronic tag placed in the organism of the female animal, triggered by said detection device and/or an identification device of the female animal by processing an image of at least a part of the female animal which processing is activated by said detection device.

Because of these provisions, a very small number of animals are wearing said device: male detecting animals (castrated or complete and prevented from mounting) or androgenized females. Implementation of this invention is therefore very economical. Furthermore, the animals equipped with the device which is the subject of this invention may wear this device permanently thereby reducing the number of necessary manipulations.

According to particular characteristics, the device as succinctly described above includes a means for identifying an electronic tag placed in the organism of the female animal and which is activated by said detection device.

According to particular characteristics, said electronic tag is placed in the digestive tract of the female animal.

Because of each of these provisions, identification is made remotely and can activate the transponders already installed in the organisms of the female animals. Since the mounted females are all wearing a permanent individual electronic tag which is required by law, these provisions make it possible to further reduce the cost of detection. All that is needed is that the device be positioned in an anatomic zone that is favorable for allowing detection.

The development of RFID technology, and in particular, the development of passive electronic tags (without an internal source of energy) can be used for the implementation of the present invention and the tags already in use for animal identification can be utilized. The expenditure necessary for implementing the present invention being therefore limited to the deployment of the devices which are the subject of the present invention.

According to particular characteristics, the device as succinctly described above includes a memory for identification of excluded electronic tags and a means for exclusion of electronic tag identifications that is capable of not taking into account tag identifications that are stored in said memory.

Using these provisions it is possible to exclude the identification of the animal wearing the device, for example by storing only data that is useful for the identification of female animals in heat.

According to particular characteristics the means for detection and identification are capable of emitting an electromagnetic field energizing the electronic tag placed in the organism of the female animal in order to energize said electronic tag.

Because of these provisions the electronic tags worn by the female animals do not require including a source of energy, making them therefore less expensive.

According to particular characteristics, the means for identification includes a means for writing in the electronic tag placed in the organism of the female animal.

Because of these provisions, each female can be identified as being in heat by reading her electronic tag, either by a fixed base-station, for example located in a milking parlor, in proximity of a drinking trough or in any other location where the animals go frequently, or by a mobile base-station.

According to particular characteristics, the means for attachment includes a harness positioning, at the time of a mounting attempt, an antenna providing the means for identification of an electronic tag placed in the organism of the female animal in place so as to receive signals emitted by said electronic tag placed in the organism of the female animal.

According to particular characteristics, the means for detection of the attempt to mount includes a perpendicularity sensor, a sensor for the pressure exerted on the back of the female animal, placed under the belly of the animal wearing the device and/or a sensor recording the movements of the animal wearing the device.

Because of each of these provisions, the detection of the attempt to mount is convenient and reliable.

According to particular characteristics, the device as succinctly described above includes a means for identifying the female animal by processing an image of at least a part of the female animal, said means of identification being activated by said detection device.

Because of these provisions it is not necessary that the female wear an electronic tag, the biometric recognition of the females being made by the device worn by the animal liable to make attempts to mount the female animal.

According to particular characteristics, the device as succinctly described above includes a means to determine the time and day of each mounting attempt.

Because of these provisions, whether it be the device or the electronic tags of the female animals which store the data on the mounting attempts, the stock-breeder is able to determine the dates and hours when the heat begins as well as the number of attempts to mount any given female.

According to particular characteristics, the device as succinctly described above includes a means for transmitting at least a part of the identification of the female animals identified by the means of identification.

Because of these provisions, reading the identifiers of the females in heat is convenient easy and can be done at regular time intervals, for example once or several times per day.

According to particular characteristics, the device such as succinctly described above includes a means for processing the identifications of the female animals that is capable of determining at least one result of statistical analysis of attempts to mount each female animal.

For instance, the means for processing provides the optimal time for inseminating at least one animal having undergone one or several attempts to be mounted.

According to particular characteristics, the means for processing the identifications of female animals is capable of determining said result as a function of a calibration of the libido of at least one animal of said fraction of animals of the herd.

Because of these provisions the validity of the processing is improved.

According to a second aspect, the present invention aims at a device for computerized detection of mountings between animals, intended to be placed in the organism of a female animal, characterized by the fact that it includes:

a means for detecting an attempt to mount said female animal by another animal, a means for processing said mounting attempt, and a means for transmitting the result of the processing.

According to a third aspect, the present invention aims at a process for computerized detection of mountings between animals, characterized by the fact that it includes:

an installation phase, on a fraction of the animals of the herd, each animal of said fraction being liable to make said mounting attempt, for a means for detecting the attempt to mount a female animal and of a means for identifying said female animal, a step of detecting a mounting attempt by said animal of a female animal, and in case of detection of a mounting attempt, a step of identifying an electronic tag placed in the organism of the detected female animal or of identifying the female animal by processing an image of said female animal.

As the advantages, aims and particular characteristics of this device and this process are similar to those of the device considered by the first aspect of the present invention, they are not reiterated here.

BRIEF DESCRIPTION OF THE SEVERAL VIEWS OF THE DRAWINGS

Other advantages, aims and characteristics of the present invention will appear from the following description which is given to serve as an explanation and which is in no way limiting with respect to the attached drawings.

DETAILED DESCRIPTION OF THE INVENTION

Before proceeding with the description of the particular ways of execution illustrated in the figures, the following facts are mentioned.

Following the string of health crises and in order to respond to the demand for animal traceability, the European Community has strongly encouraged the unique and tamper-proof identification of all animals. It has become evident that electronic identification by transponder (known under the technology term of RFID for Radio Frequency Identification) was well suited to meet this need to identify all animals.

A transponder (or "electronic tag") is a miniaturized electronic circuit which emits, when stimulated by an electromagnetic field, and possibly in response to any read requests emitted by a base station, an identifying signal which is picked up by the emitting antenna by modulating said electromagnetic field. Various supports of these transponders have been developed to adapt to the various characteristics of the animals and the products consumed. The simplest solution in animal husbandry consists of integrating a transponder in the traditional plastic tags placed at the animals' ears and which can be read by the stock-breeder. The second system, more often used on companion animals, consists of injecting under the skin of the animal, the transponder which is integrated in a glass or inert plastic casing. A third system, which is specific to ruminants, is called a "bolus". The bolus is a (high density) ceramic cylinder of variable mass and size depending on the species, which is placed by intubation in the forestomach of the ruminant where it remains sequestered. Finally there is a fourth system that is used with pigs which consists of injecting a transponder into the cavity of the peritoneum. Eventually all farm animals of the European Community will have to be identified by one of the four types of support.

Figure 1A:
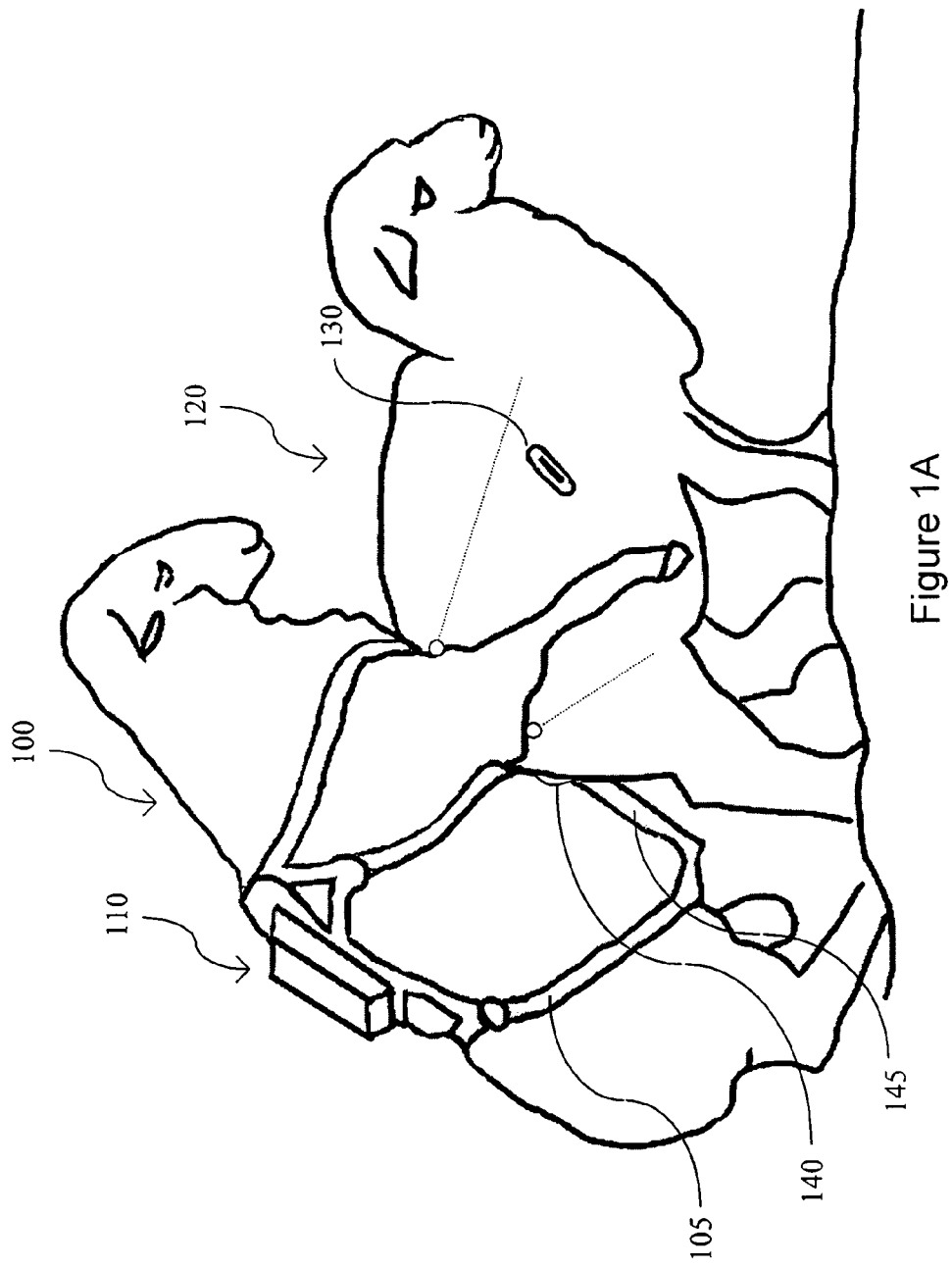
FIGS. 1A to 1D represent schematic views of a first particular way of making the device which is the subject of the present invention.
Figure 1B:
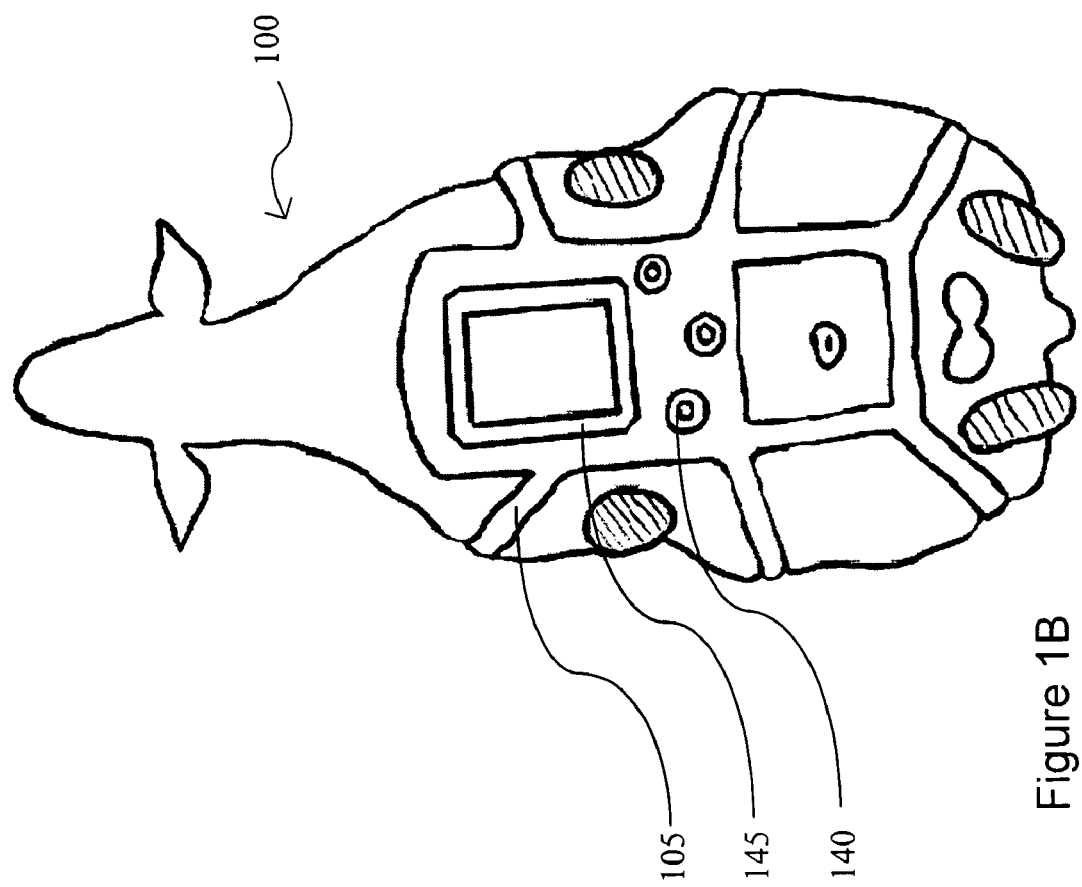
Figure 1C:
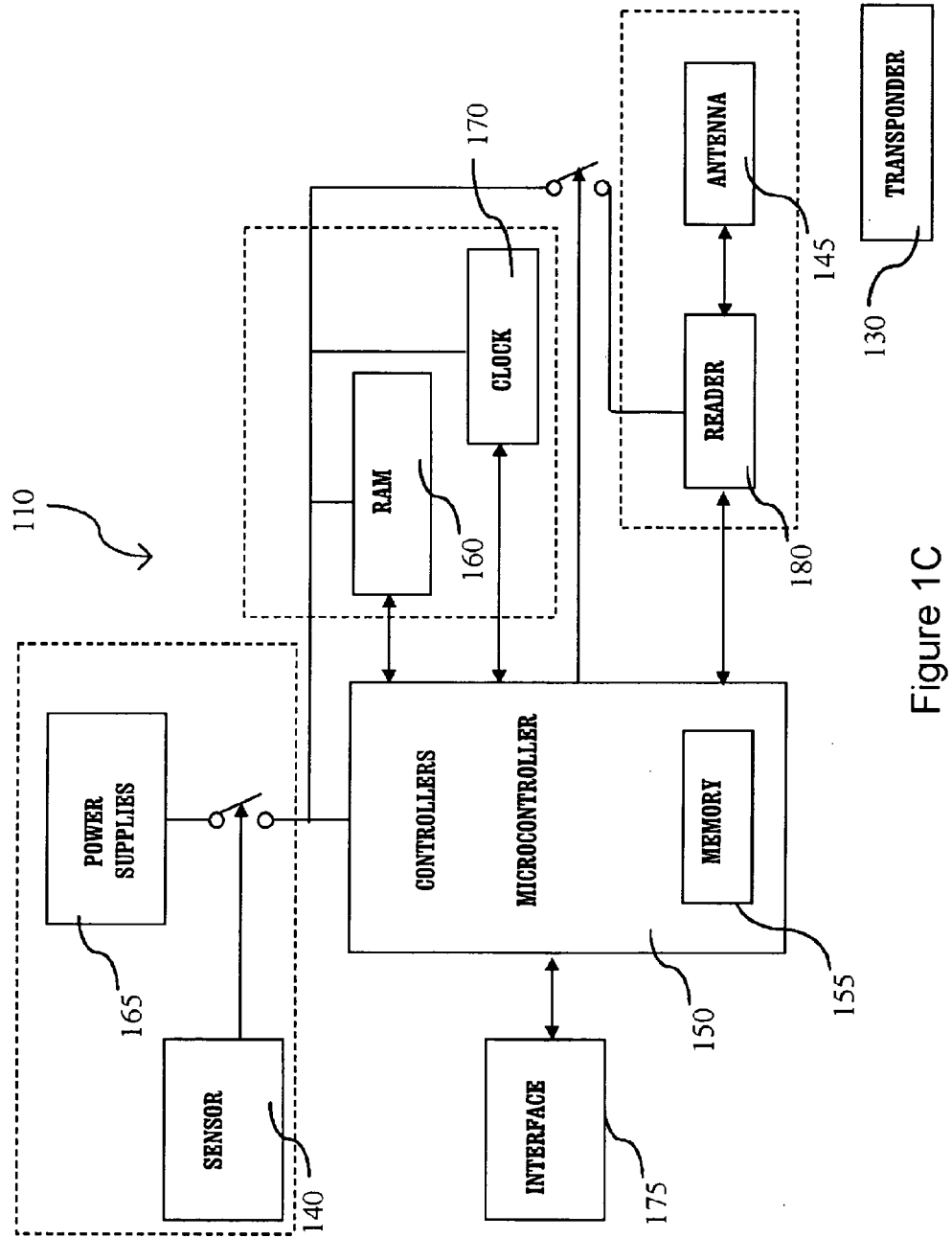
Figure 1D:
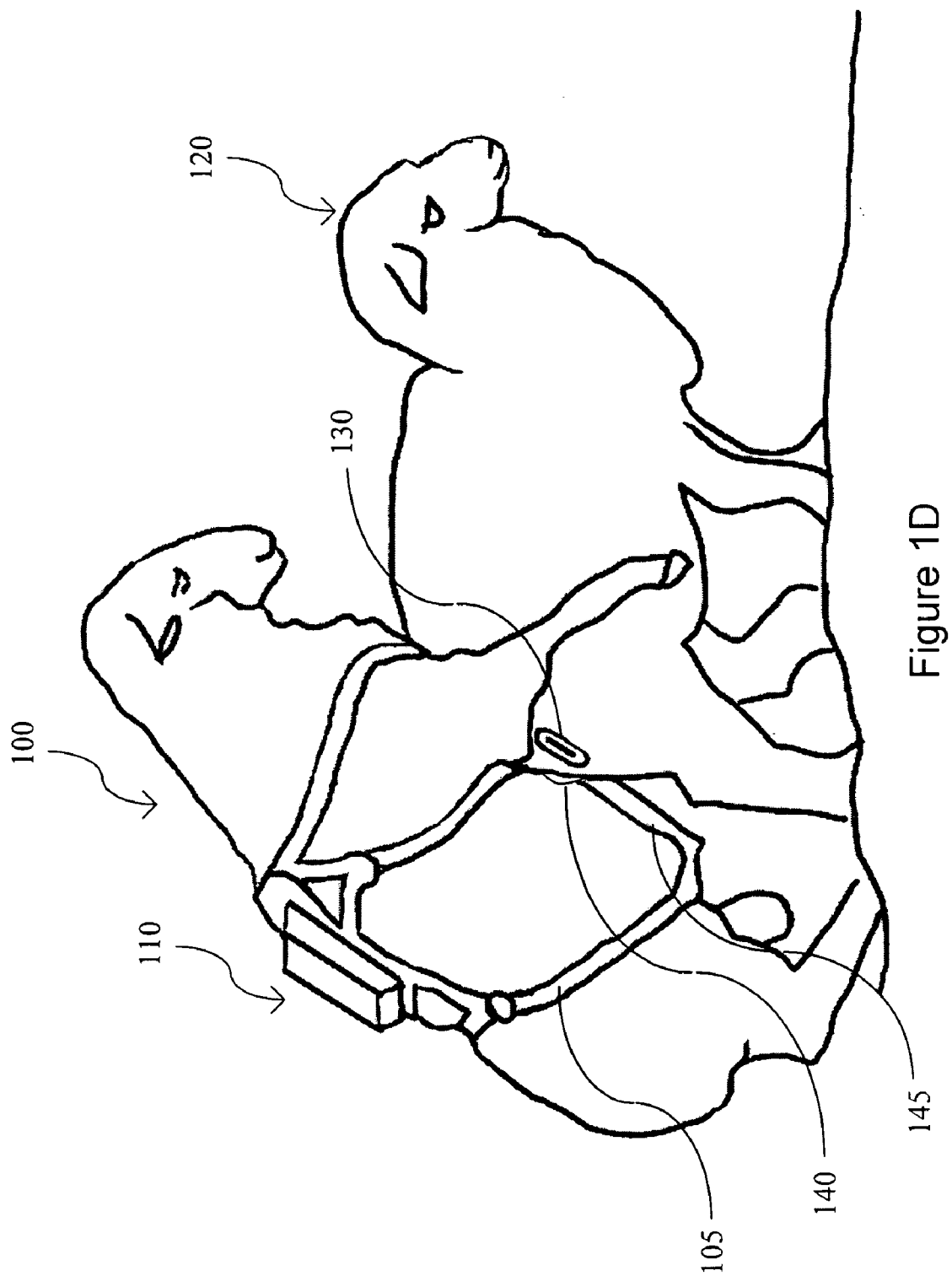

FIGS. 1A and 1D shows an animal 100, wearing the device 110 using a fastener 105, mounting a female animal 120 wearing a transponder or electronic tag 130.

The animal 100 is a male or an androgenized female. It has thus the tendency to mount the females in heat. The fastener 105 is here a harness holding in place on the animal 100 the different elements of the device 110. The transponder 130 is a passive transponder without a source of energy, of the classic type, for example in conformance with the ISO IDEA norm. It retains a unique identifier which identifies the animal 120 wearing it. In FIG. 1A the transponder 130 is a ruminal bolus. In FIG. 1D the transponder 130 is sub-cutaneous or intraperitoneal.

The device 110 includes:
a mounting sensor 140,
an antenna 145,
means for control 150,
a program memory 155,
a RAM (random access memory 160,
an electrical supply 165
a clock 170,
a communication interface 175, and
a radio frequency communication module 180.

The mounting sensor 140 is, for example, a pressure sensor placed under the belly of the animal 100 or a verticality sensor (for example a ball switch), a temperature sensor that senses the temperature generated by a congener or a motion sensor (for example volumetric) detecting the presence of another animal.

It emits a signal of detection during the mounting attempts. The communication interface 175, here a serial link, allows programming the control devices 150, in this case a microcontroller. As a variant, the interface 175 is a wireless link, for instance by radio or infrared.

The antenna 145 is capable of emitting an electromagnetic field oriented towards the underside of the animal 100 wearing the device which is the subject of the present invention. Thus, as soon as the animal wearing it is on top of a female, the device establishes a communication with the electronic tag worn by said female 120.

Through programming of the controlling means 150, the device 110 is capable of reading the identifiers of the transponders located within range of its antenna 145, when the mounting sensor 140 detects a mounting attempt, and to store these identifiers in the RAM 160 with information of the date and time of the mounting attempt. Date and time are provided by the clock 170.

In order to avoid useless readings, for instance when the animal 100 lies down, the mounting detection signal emitted by the mounting sensor may only be taken into consideration when it lasts longer than a predetermined length of time, for example five seconds. For this purpose one can use an analog memory placed at the output of the mounting sensor 140.

A base-station (not shown), of the known type, is capable of reading the RAM 160 when the device and the base-station are located within proximity of each other. The base-station can be stationary or mobile. Communication between the base-station and the device is achieved through the intermediary of the interface 175 which can be a serial or a radio or infrared link. For this communication, the controllers 150 carry out the instructions transmitted by the base-station.

Thus, depending on the scanning mode of the memory of the device, which may be continuous or discontinuous, interventions by the operator are limited to the transfer and/or the erasure of data contained in the devices worn by the few animals wearing these devices, and the identity of the females that have been mounted is thus known.

The device 110 integrates an anti-collision processing module (not shown) of the identifiers contained in the tags worn by the mounted animal and by the mounting animal, at the time the readings are activated: only the identity of the mounted animal is stored. This module avoids reading the identifier of the animal wearing the device 110 or, if it is read, avoids storing this identifier with the identifiers of the mounted animals.

All females of the lot are then sorted by reading, with the base-station, the identifiers stored by their electronic tags and the females which have been mounted are then isolated in order to be inseminated.

Thus, the invention utilizes the fact that all females of a herd can be identified by a transponder, either in form of a subcutaneous implant or by an intraperitoneal transponder, or by a ruminal bolus. The male (vasectomized or prevented from coupling) or the androgenized female put into contact with the females will attempt to couple with those that are in heat. Since this male wears a transponder reading device which is activated by a mounting sensor (for example a sensor of verticality or of pressure exerted on the rump of the female), it collects and stores the number of the female as well as the date and time of the mounting attempt or it writes into the transponder of the female his identifier, the date and time of the mounting attempt.

The identifying information on the females in heat that is stored in the device is then sent to a receiving radio terminal which reads the RAM of this device. Then a data processing program determines which female is in heat, based on the number and the frequency of mounting attempts on each of the females.

As a variant (not shown) the device 110 includes a means for analyzing the stored information which provides the optimal time for insemination of at least one animal having experienced a mounting attempt.

Since the identification of the females is facilitated by the transponder they wear, the entire herd can be sent through a check gate equipped with a base-station reading their identifiers and separating the females to be inseminated (by natural or artificial means) from the other females.

In one particular mode of carrying out the invention, a Tiris RI-RFM-006A (Texas Instrument) reader kit was used in the device as a radio frequency communication module 180, which is sold by a transponder maker, conforms to the animal identification ISO norm and can be implanted either in the tail area of the females or contained in a ruminal bolus.

The functions of this prototype ensure:
1) authorization of activation of a reading sequence (pressure or perpendicularity sensors) when the male mounts a female,
2) activation of a reader antenna adapted to the distance of the transponder worn by the female,
3) that all operations for the identifiers that were read are processed: activation, reading, recording and storage of the identifier of each mounted female, of the date and time of the mounting attempt,
4) fastening of the device on the back of the male by means of a harness which has been adapted to correctly position the reading antenna and the mounting sensors, and
5) transfer and/or the deletion of the RAM by a base-station interfacing with a microcomputer or a portable terminal including a microcontroller programmed for making a list of females in heat identified by their electronic tags.

Figure 2:
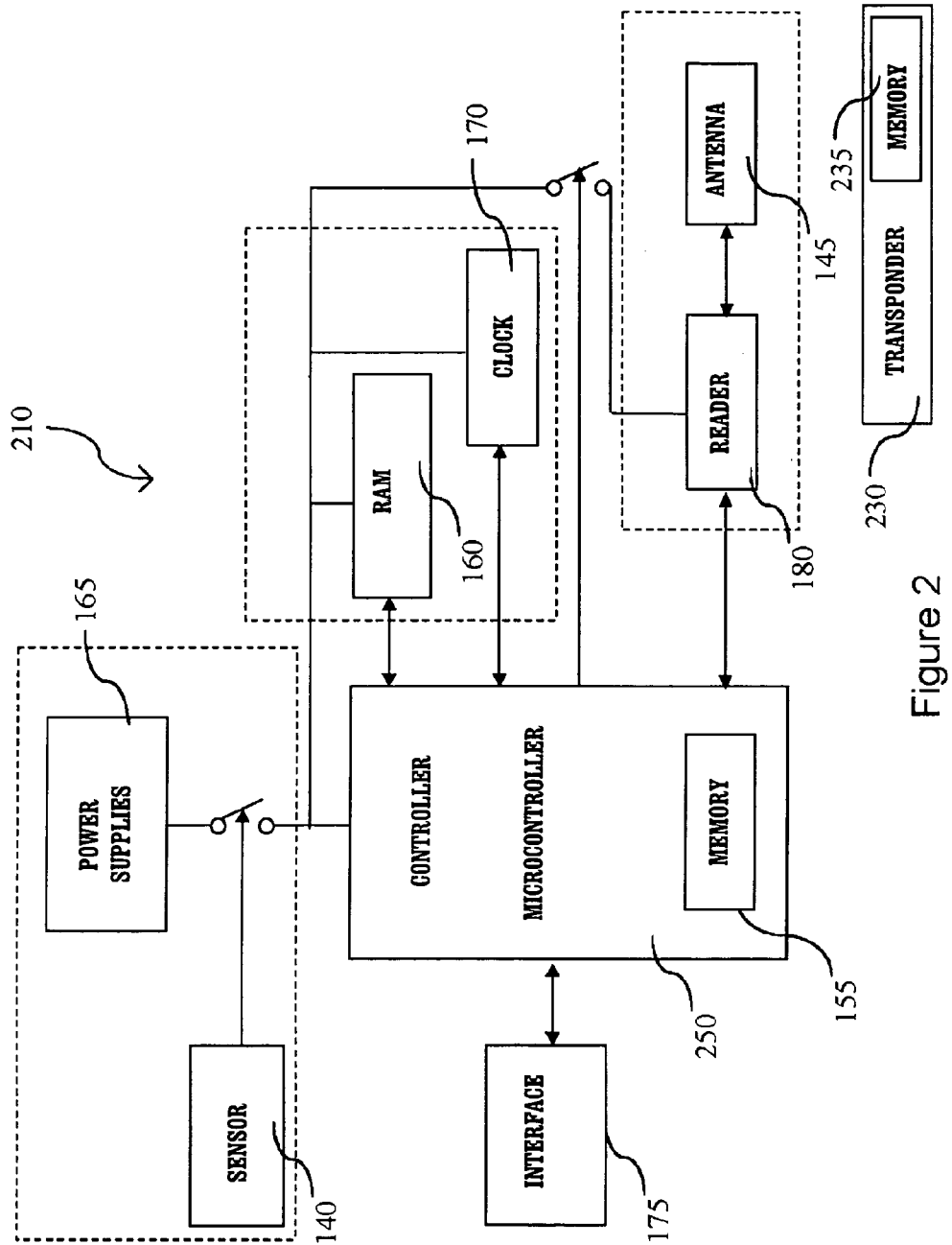
FIG. 2 represents a schematic view of a second particular way of making the device which is the subject of the present invention.

FIG. 2 shows a second particular mode of execution of the device, which is the subject of the present invention. An animal 100 wearing the device 210 with a fastener 105, is mounting a female animal 120 wearing a transponder or an electronic tag 230.

The transponder 230 is a passive transponder which does not include a source of energy, of the classic type, for example in conformance with the ISO IDEA norm. It has a RAM 235 into which the device 210 can write information that is representative of at least one mounting attempt of the animal 120 which is wearing it. It retains a unique identifier which identifies the animal 120 wearing it.

The device 210 includes:
mounting sensor 140,
antenna 145,
controllers 250,
program memory 155,
RAM 160,
electric energy supply 165
clock 170,
communication interface 175, and
radio frequency communication module 180.

Through programming of the controllers 250, the device 210 is capable of writing information representative of the mounting attempt into the RAM 235 of the transponder 230 located within range of its antenna 145 when the mounting sensor detects a mounting attempt. Preferably, it writes this information together with indication of the date and time of the mounting attempt.

Preferably, at each mounting attempt, this information of a mounting attempt is updated either by adding some new information or by incrementing a counter of mounting attempts and by storing the first and last dates and times of these attempts. As a variant, the identifier of the male is also written to the electronic tag worn by the female. This variant permits a paternity check in cases where the male is not prevented from mounting the females. As a matter of fact, taking into account the gestation period, when two mountings are spaced apart by more than one week, paternity can be determined.

A base-station (not shown), of the known type, is capable of reading the RAM 235 when the animal 120 and the base-station are located within proximity of each other and to reinitialize the RAM 235. The base-station may be stationary or mobile.

Thus, depending on the scanning mode of the memory of the device, which may be continuous or discontinuous, interventions by the operator are limited to the transfer of data contained in the transponders worn by the females, and the identity of the females in heat is thus known. All females of the lot are then sorted by reading, with the base-station, the information stored by their transponders and the females which are in heat are then isolated in order to be inseminated.

In the second mode of realization of the device which is the subject of the present invention, each female in heat can be identified by reading the RAM 235 of her transponder 230, for instance by a portable reader or by a reader-equipped gate like the one used for reading the identifiers.

As a variant, the device 210 includes a means for analyzing the stored information (not shown) which provides the optimal time for insemination of at least one animal having experienced one or several mounting attempts.

Figure 3:
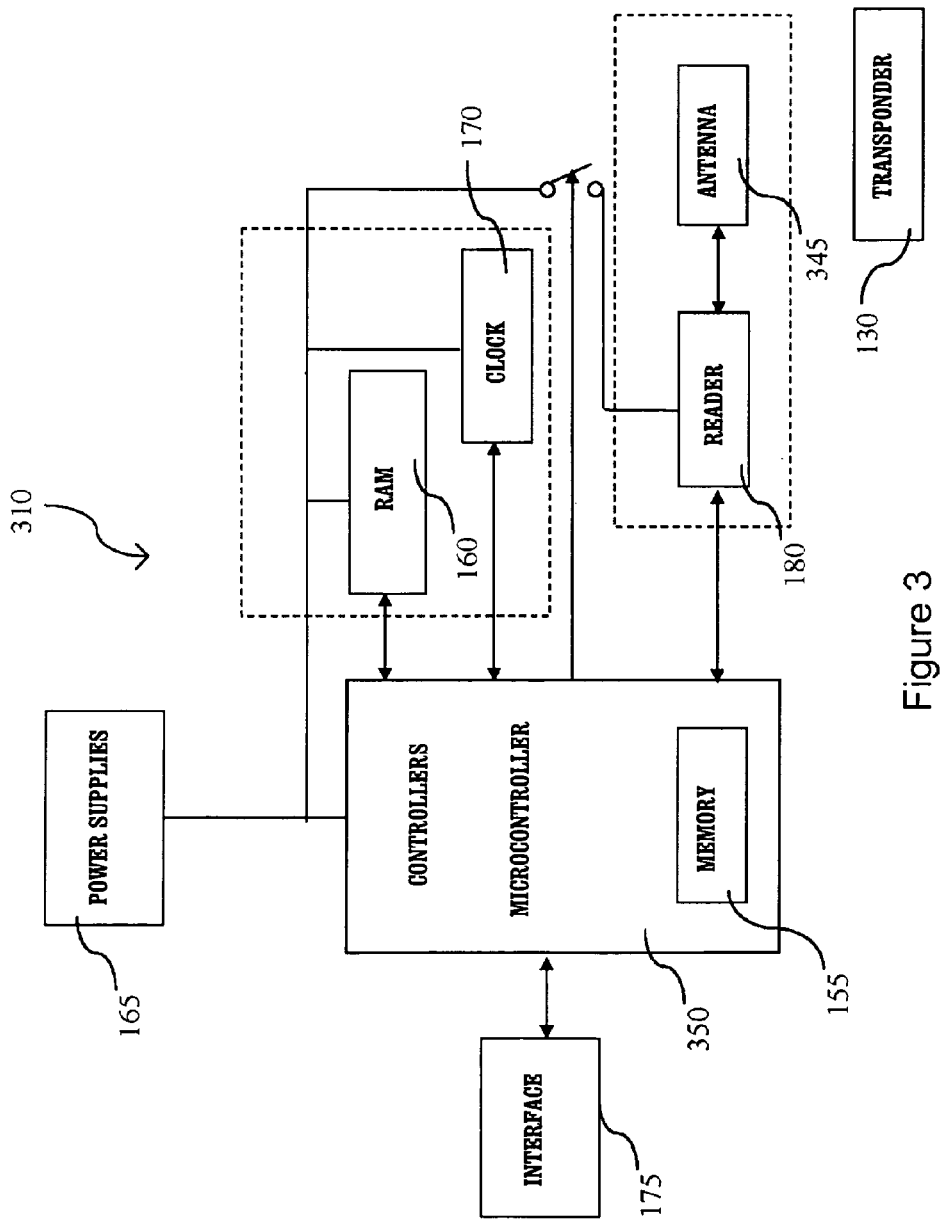
FIG. 3 represents a schematic view of a third particular way of making the device which is the subject of the present invention.

FIG. 3 shows an animal 100 wearing the device 310 attached with a fastener 105, in the process of mounting a female animal 120 wearing a transponder or an electronic tag 130.

The transponder 130 is a passive transponder without a source of energy, of the classic type, for example in conformance with the ISO IDEA norm. It retains a unique identifier which identifies the animal 120 wearing it. The device 310 includes the same elements as device 110 (FIGS. 1A to 1C) with the exception of the mounting sensor 140 which is here integrated in the antenna 345 and controllers 350 which replace the controllers 150. The antenna 345 is so constituted and positioned that it can only read transponders that are placed between the feet of the animal wearing the device 310.

By programming the controllers 350, the device 310 is capable of reading constantly the identifiers of the transponders located within range of its antenna 345, i.e., in a mounting position, and of storing these identifiers in the RAM 160 with information of the date and time of the mounting attempt.

In order to avoid interference signals, for example when the animal 100 lies down, the identifier of the female is read several times during a predetermined period, for example five seconds. If, during this time the readings give the same identifier, the detection of the mounting attempt is considered to be validated.

A base-station (not shown), of the known type, is capable of reading the RAM 160 when the device and the base-station are located within proximity of each other. The base-station may be stationary or mobile.

Thus, depending on the scanning mode of the memory of the device, which may be continuous or discontinuous, interventions are limited to the transfer (reading or erasure) of data contained in the devices worn by the few animals which wear these devices and the identity of the females in heat is thus known.

All females of the lot are then sorted by reading, with the base-station, the identifiers stored by their electronic tags and the females which are in heat are then isolated in order to be inseminated.

Figure 4:
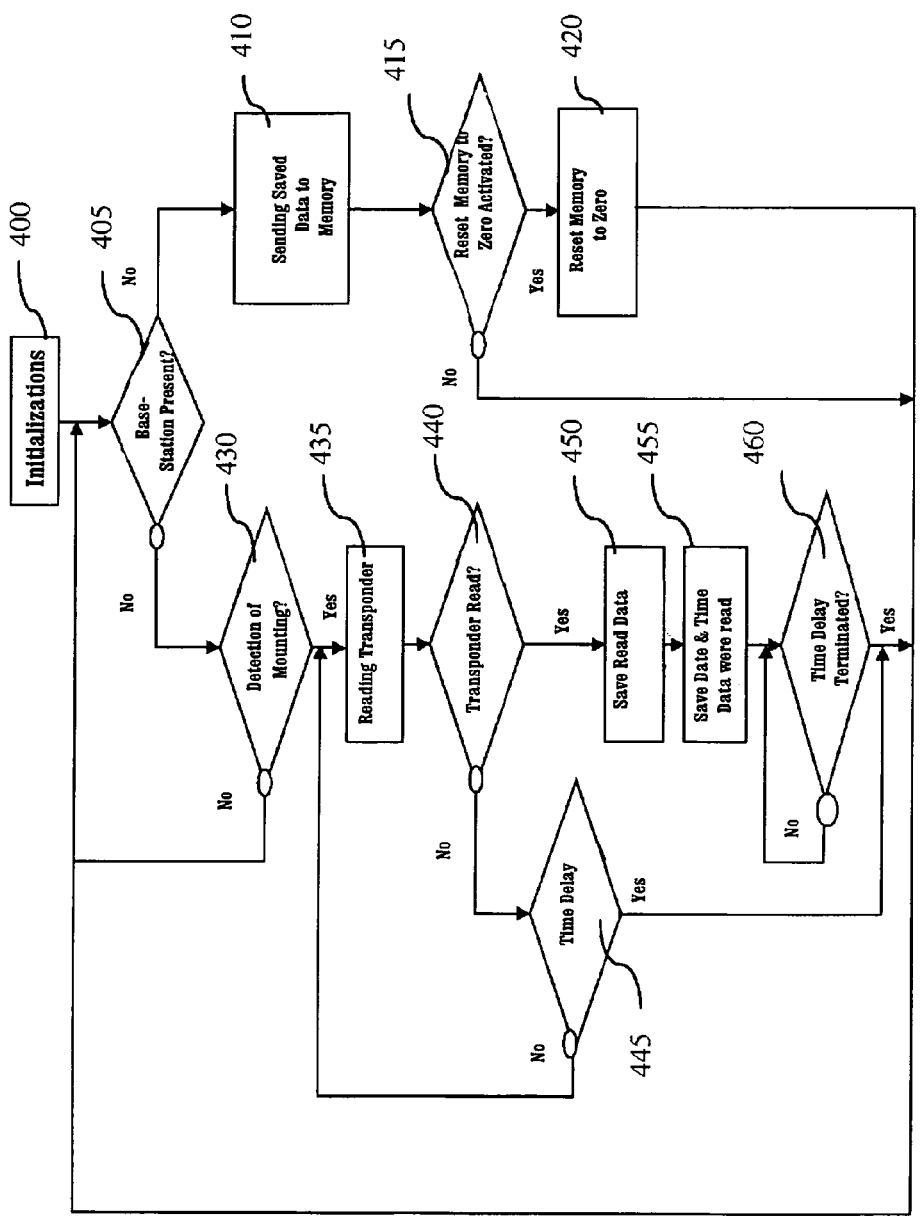
FIG. 4 represents a schematic view of a succession of steps carried out in a particular way of implementing the process which is the subject of the present invention.

FIG. 4 shows a succession of steps implemented in a particular way for realization of the process which is the subject of the present invention and which is adapted to the device shown in FIGS. 1A to 1C.

FIG. 4 shows an installation step 400 on a fraction of the animals of the herd, each animal 100 of said fraction being likely to make said mounting attempt, of a device as shown in FIGS. 1A to 3, 5 or 6, including a means for detecting the attempt to mount a female animal and of a means to identify said female animal, and of initialization of each device installed.

Then, during a step 405, it is determined whether a base-station has emitted a reading request from the RAM of the device. If yes, then during a step 410 data stored in the RAM of the device are transmitted. During a step 415 it is determined whether a reset of the RAM has been activated. If yes, then during a step 420 the content of identifiers of females stored in the RAM of the device is erased. If not or following step 420, one returns to step 405.

If the result of step 405 is negative, then during a step 430, it is determined whether the sensor of mounting attempts has detected a mounting attempt. If not, one returns to step 405. If yes, then during a step 435, a reading request of the transponders within range of the antenna is transmitted. Then during a step 440, it is determined whether a transponder identifier has been read. If not, then during a step 445, it is determined whether a predetermined time (for example five seconds) has passed since the end of step 430. If not, one returns to step 435. If yes, one returns to step 405.

If the result of step 440 is positive, then during a step 450, the read identifier is stored in the RAM of the device and during a step 455 the date and time of the mounting attempt is stored. As a variant, during step 455, one also increments the counter of mounting attempts for the identifier that was read.

Then during a step 460, it is determined whether a predetermined length of time (for example five minutes) has passed since the end of step 430. This predetermined length of time serves to avoid detecting several times in a row the same mounting attempt. If not, one returns to step 460. If yes, one returns to step 405.

As a variant, adapted to the device shown in FIG. 2, instead of steps 450 and 455, one performs a writing step of representative information of a mounting attempt, the date and time, in the transponder worn by the female.

As a variant, adapted to the device shown in FIG. 3, step 430 is eliminated.

As a variant, following step 460 and before returning to step 405, the stored information is analyzed to provide and store for the animal having experienced a mounting attempt the optimal time for insemination.

As a variant, following step 460 and before returning to step 405, it is determined whether the identifier read is not that of the animal wearing the device (male or androgenized) and, if yes, this identifier is erased from the memory of mounting attempts.

The present invention is not limited to the utilization of tags of the RFID type but quite to the contrary, extends to any animal identification system, even without physical support. In particular, all technologies for reading and/or writing to electronic tags conform to the spirit of the present invention. Furthermore, the present invention can function with a digital movie or still camera worn by the male or the androgenized female which takes at least one picture of the female on which the mounting attempt takes place, as described with regard to FIGS. 5 and 6.

Figure 5:
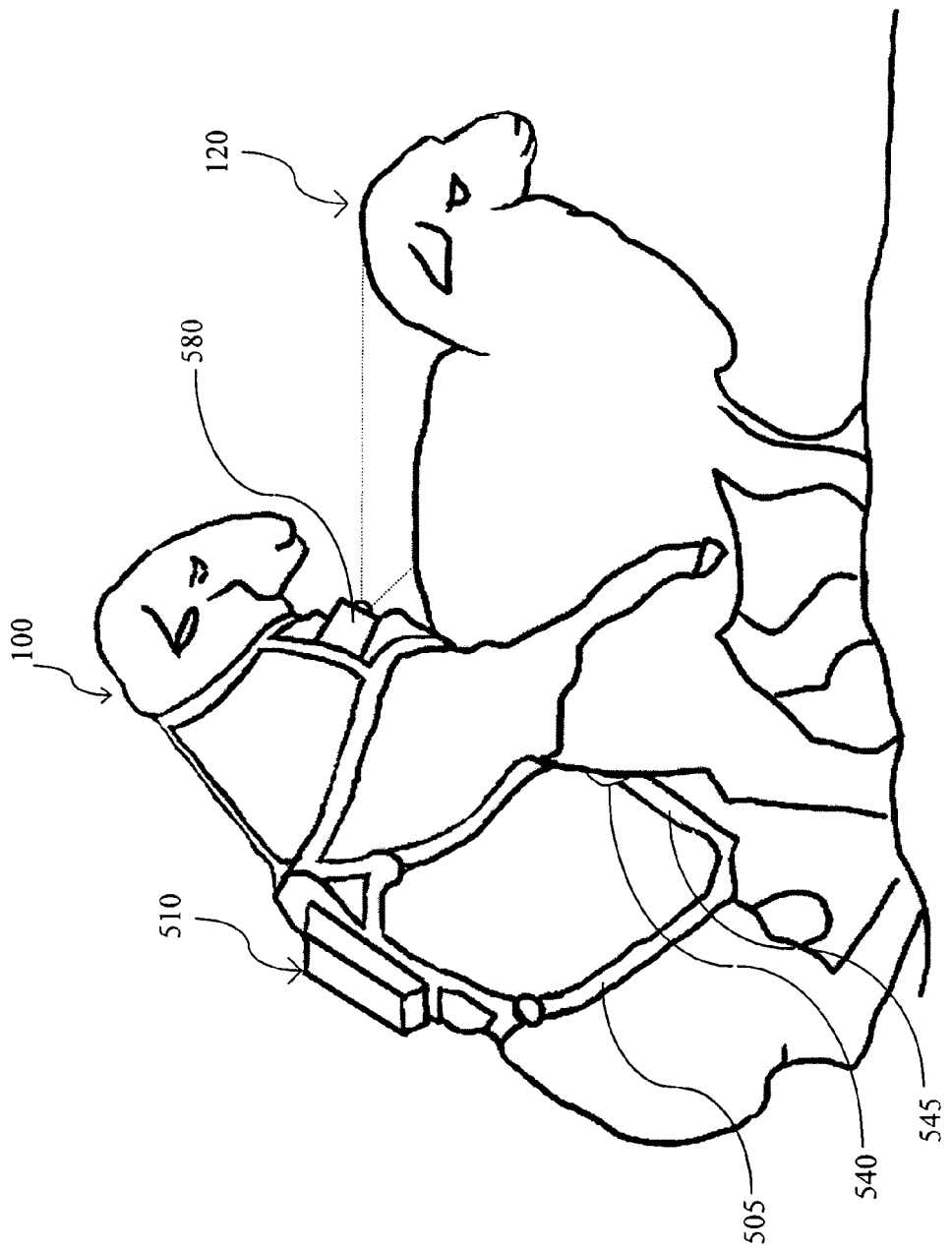
FIGS. 5 and 6 represent schematic views of a fourth particular way of making the device which is the subject of the present invention.
Figure 6:
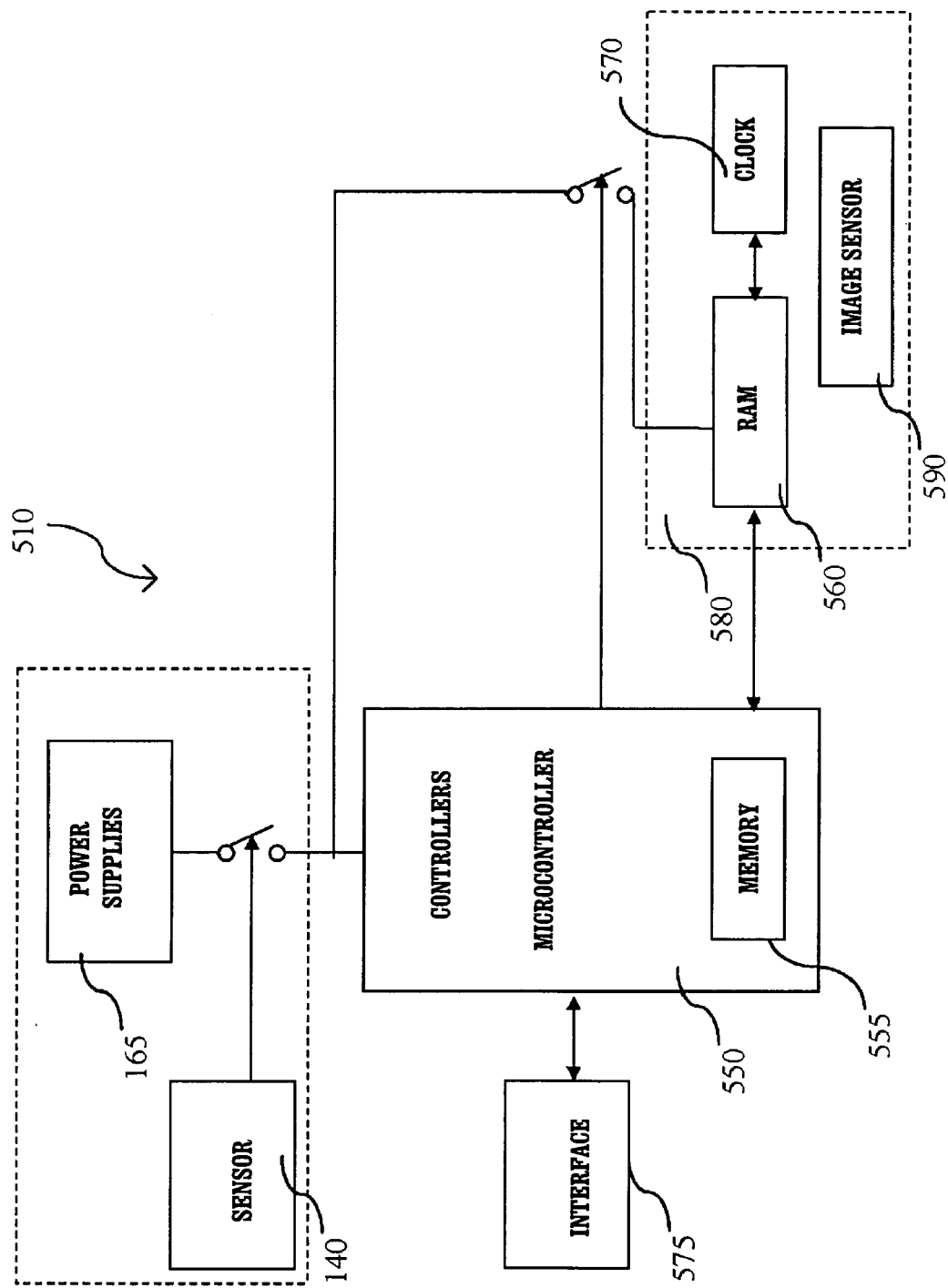

FIG. 5 shows an animal 100, wearing the device 510 with a fastener 505, mounting a female animal 120.

The animal 100 is a male or an androgenized female. It has therefore a tendency to mount females in heat. The fastener 505 is here a harness holding in place on the animal 100 the different elements of the device 510. The device 510 includes (see FIG. 6):

mounting sensor 140,
controllers 550,
a program memory 555,
an electrical power supply 565,
a camera 580 including an image counter 590, a clock 570 and a RAM 560 and
a communication interface 575.

The communication interface 575, a serial link or wireless, permits programming the controllers 550, in this case a microcontroller, and reading the memory of the camera 580.

Through programming of the controllers 550, the device 510 is capable of triggering the taking of a photo of the animal 120, when the mounting sensor 140 detects a mounting attempt, and of storing this photo in the RAM 560, with information on the date and time of the mounting attempt. Date and time are provided by the clock 570.

In order to avoid useless readings, for instance when the animal 100 lies down, the mounting detection signal emitted by the mounting sensor may only be taken into consideration when it lasts longer than a predetermined length of time, for example five seconds. For this purpose on can use an analog memory placed at the output of the mounting sensor 140.

A computer (not shown), of the known type, is capable of reading the RAM 560 when the device 510 and the computer are linked through the intermediary of the communication interface 575. The computer may be stationary or portable. The computer is capable of printing images of the mounted females or to perform automatic recognition of these females using image processing software of the known type, for example in biometrics.

Thus, the interventions of the operator are limited to the transfer and/or erasure of the data contained in the devices worn by the few animals wearing these devices, and the photos of the females which have been mounted permit their triage.

As a variant (not shown) the device 510 includes a means for analyzing stored images which provides the identity of the females (for example by recognizing biometric characteristics, bar codes or other distinctive markings (for example, painted numbering) and/or the optimal time for insemination of at least one female having experienced a mounting attempt.

Figure 7:
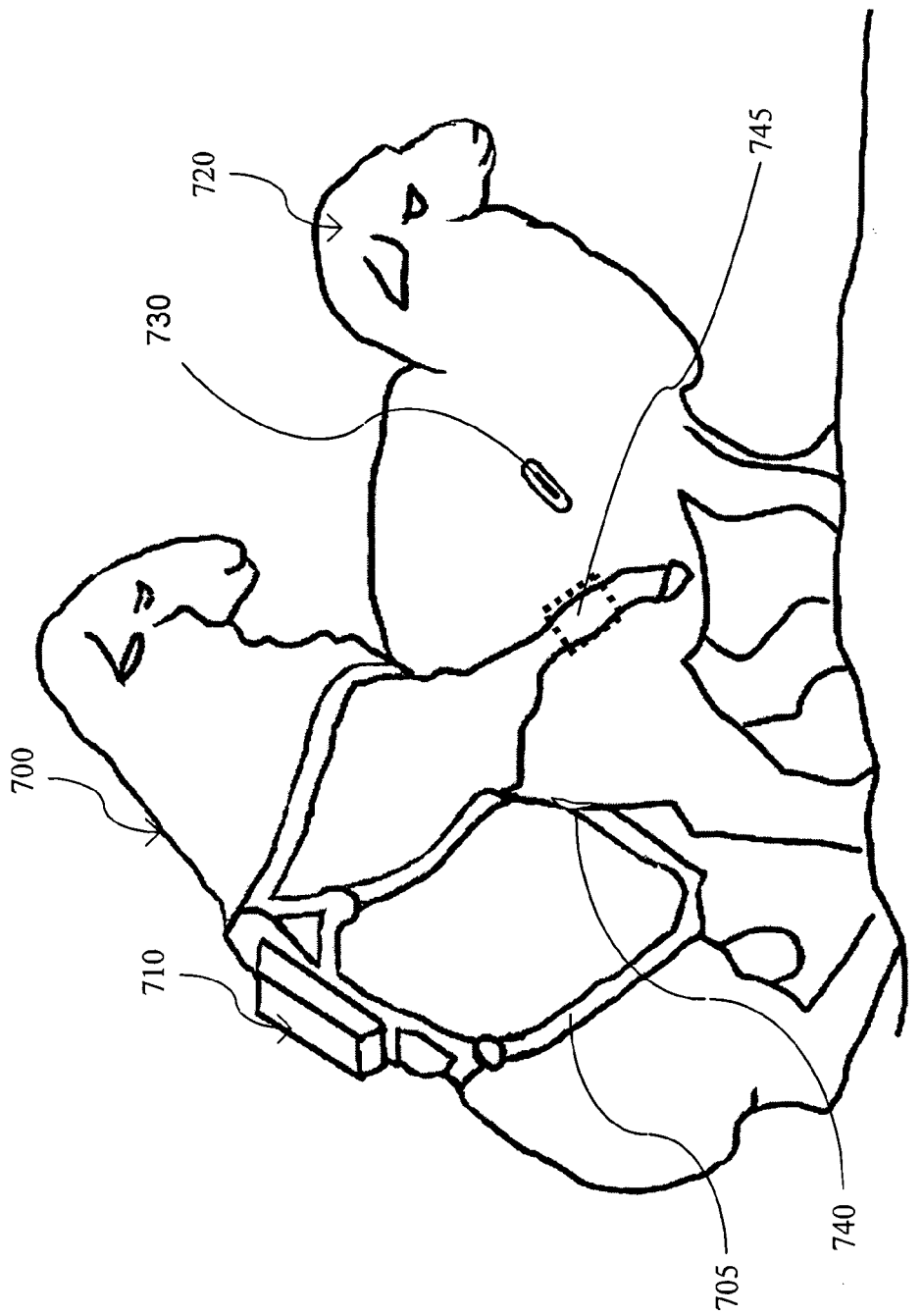
FIGS. 7 and 8 represent schematic views of a fifth particular way of making the device which is the subject of the present invention.
Figure 8:
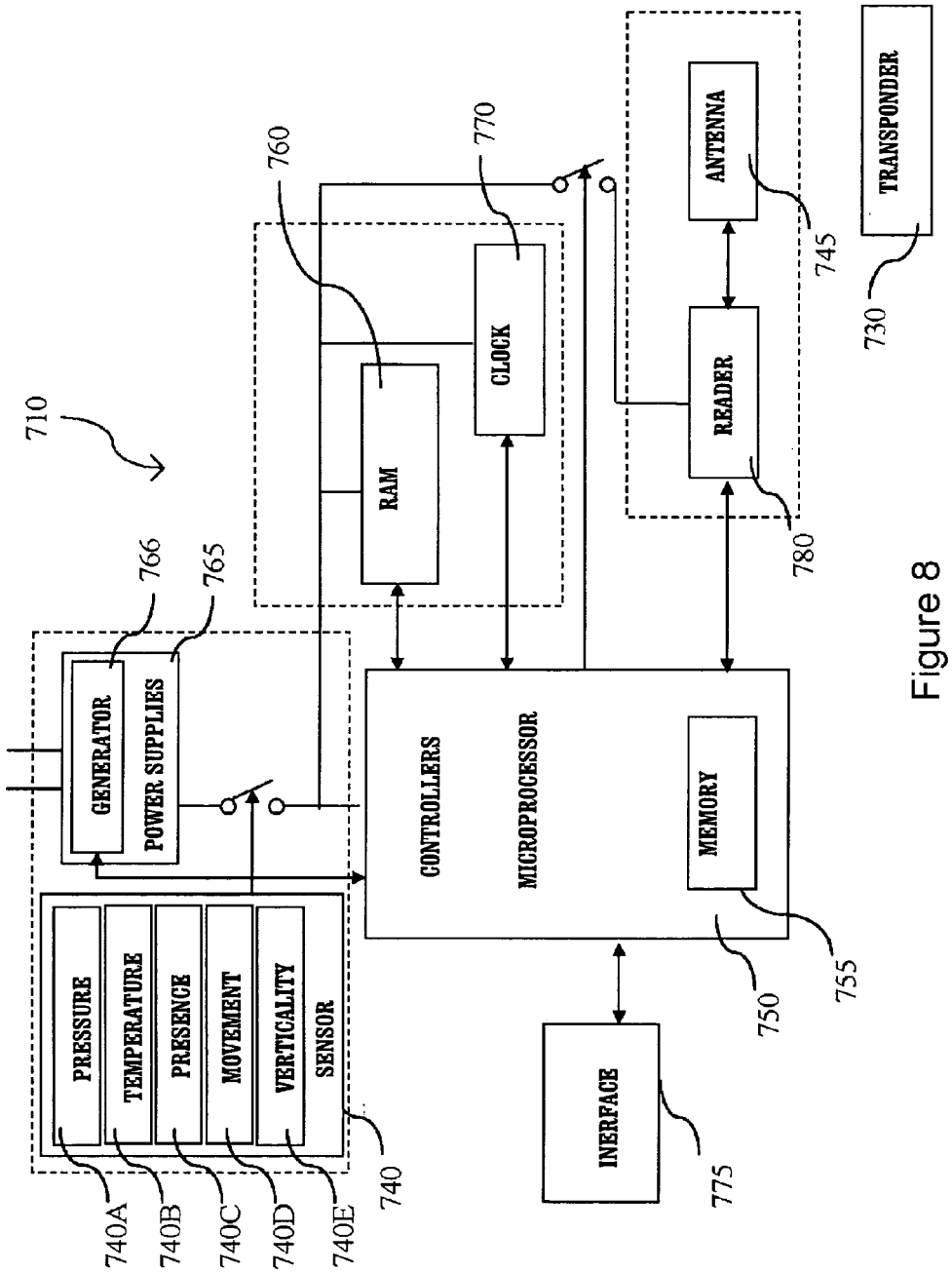

FIG. 7 shows an animal 700, wearing the device 710 with a fastener 705, in the process of mounting a female animal 720 wearing a transponder or electronic tag 730. The diagram of an electronic circuit of the device 710 is provided in FIG. 8.

The animal 700 is a male or an androgenized female. It therefore has a tendency to mount the females in heat. The fastener 705 here is a harness keeping in place on the animal 700 the different elements of the device 710. In the execution of the invention described in FIG. 7, the fastener 705 is capable of positioning an antenna 745 for emitting-receiving electromagnetic signals between the front feet of the animal 700 or on one of its front feet.

Thus, the antenna 745 is capable of emitting an electromagnetic field oriented towards the belly of the animal 700 wearing the device which is the subject of the present invention. Thus, as soon as the animal wearing it finds itself on top of a female 720, the device begins to communicate with the electronic tag worn by said female 720.

The transponder 730 is a passive transponder not including any source of energy, of the classic type, for example in conformance with the ISO IDEA norm. It maintains a unique identifier which identifies the animal 720 wearing it. In FIG. 7, the transponder 730 is an electronic tag implementing the RFID standard and is placed in an internal cavity or internal organ of the body of the animal 720. The transponder 730 is either placed permanently, for example in the abdomen of the animal 720 or temporarily, for example in the vagina of the animal 720. As a variant, the transponder 730 is attached to the ear of the animal 720.

The device 710 includes:
a mounting sensor 740,
the antenna 745,
controllers 750,
a program memory 755,
a RAM 760,
an electric power supply 765,
a clock 770,
a communication interface 775, and
a radio-frequency communication module 780.

The mounting sensor 740 consists preferably of several sensors:
at least one pressure sensor 740A placed under the belly of the animal 700 which detects the weight of the animal 700 on the body of the animal 720;
at least one temperature sensor 740B which detects the temperature generated by the animal 720;
a presence sensor 740C (for example a volumetric sensor and/or an infrared radiation detector) detecting the presence of the animal 720 under the body of the animal 700;
a motion sensor 740D of the animal 700 (for example a ball-type acceleration meter) detecting the jump of the animal 700 onto the body of the animal 720 and/or characteristic movements of the mounting behavior; and/or
a perpendicularity sensor 740E (for example a ball-type switch) which detects the oblique position of the body of the animal 700.

The mounting sensor 740 establishes detection thresholds for each of the physical variables recorded and possibly processing of the measured values, for example in order to verify that at least two physical variables recorded correspond to a mounting attempt and emits a signal of detecting a mounting during the mounting attempts. The communication interface 775, a serial link or a wireless link, permits programming of the controllers, here a microcontroller.

Through the programming of the controllers 750 the device 710 is capable of reading the identifiers of the transponders located within range of its antenna 745 when the mounting sensor 740 detects a mounting attempt, and to store these identifiers in the RAM 760, with information on the date and time of the mounting attempt. Date and time are supplied by the clock 770.

In order to avoid useless readings, for instance when the animal 700 lies down, the mounting detection signal emitted by the mounting sensor 740 may only be taken into consideration when it lasts longer than a predetermined length of time, for example five seconds. For this purpose one can use an analog memory placed at the output of the mounting sensor 740 in order to verify that the minimal duration of detection has been attained.

The device 710 integrates an anti-collision processing module (not shown) of the identifiers contained in the tags worn by the mounted animal 720 and by the mounting animal 710, at the time the readings are activated: only the identity of the mounted animal 720 is stored. This module avoids reading the identifier of the animal wearing the device 710 or, if it is read, avoids storing this identifier with the identifiers of the mounted animals 720.

The electric power supplies 765 of the device 710 include two electrodes placed at the contact of the body of the animal 700 and a tension generator 766, for example of 100 Volts controlled by the controller 750. When the controllers 750 detect that the animal 700 is mounting, within a predetermined time interval, the same female animal 720 a predetermined number of times, the two electrodes are energized in order to trigger an unpleasant stimulus for the animal 700. In this manner one prevents a male from remaining excessively on a single female and incites him to seek out another female in heat among the herd. This stimulus is activated in this manner when the number of consecutive mountings or within a fairly short lapse of time, of the same female exceeds a certain value. This number of mountings is either fixed or indexed on the calibration described below with respect to FIG. 9.

As a variant, the electrodes are placed so that it is the animal 720 which receives the unpleasant stimulus. This way one incites the animal 720 to move away from the animal 700 so that he may seek out other females in heat.

Preferably, in both cases, the activation of the moment of electric discharge as well as the identifier of the animal 720 will be recorded in the memory so as to be able to interpret the number of stored mounting attempts.

A base-station (not shown), of the known type, is capable of reading the RAM 760 when the device 710 and the base-station are located within proximity of each other. The base-station may be stationary or mobile. The antenna 745 is used for this communication with the base-station and the controllers 750 carry out the instructions transmitted by the base-station.

Thus, depending on the scanning mode of the memory of the device 710, which may be continuous or discontinuous, interventions are limited to the transfer and/or erasure of data contained in the devices 710 worn by the few animals 700 which wear these devices. Then a data processing program determines the females 720 that are in heat, depending on the number and frequency of the attempts to mount each of the females.

All the females of the lot are then sorted by reading, with the base-station, the identifiers maintained by their transponders 730 and the females 720 which have been mounted are isolated to be inseminated (naturally or artificially). If applicable, the information read by the base-station is analyzed in memory 760 to provide the optimal time for insemination of at least one female animal 720 having experienced a mounting attempt by the animal 700.

In this manner the invention utilizes the fact that all the females of a herd can be identified by a transponder 730. The male (vasectomized or prevented from mounting) or the androgenized female 700, which is put into contact with the females, is going to try to mount those of these females that are in heat. Since the animal 700 wears a transponder 730 reading device 710 which is activated by the mounting sensor 740, this device 710 collects and stores the unique identifier of each mounted female 720 as well as the date and time of the mounting attempt.

As a variant, the device 710 worn by the mounting animal 700 writes, into the memory of the transponder 730 of the mounted female 720, its identifier, the date and time of the mounting attempt.

As a variant (not shown) the device 710 includes a means for analyzing information stored in memory 760 which provides the optimal time for insemination of at least one female animal having experienced a mounting attempt by the animal 700.

In one particular mode of carrying out the invention, a Tiris RI-RFM-006A (Texas Instrument) reader kit was used in the device 710 as a radio frequency communication module 780, which is sold by a maker of transponders 730 and which conforms to the animal identification ISO norm.

The functions of this mode of execution ensure:
1) authorization of activation of a reading sequence (by the mounting sensor 740) when the male 700 mounts a female 720,
2) activation of a reader antenna 745 adapted, in its shape and in emitting power and/or reception sensitivity, to the distance which separates it from the transponder 730 worn by the female 720,
3) the entirety of the processing operations for the identifiers of the females 720 that were read: activation, reading, recording and storage of the identifier of each mounted female 720, and of the date and time of the mounting attempt,
4) the fastening of the device 710 on the back of the male 700 by means of a harness which has been adapted to correctly position the reading antenna 745 and each sensor of physical variables of the mounting sensors 740, and
5) the transfer of content and/or the erasure of the RAM 760 by a base-station interfacing with a microcomputer or a portable terminal including a microcontroller programmed for making a list of females in heat 720 identified by their electronic tags.

Figure 9:
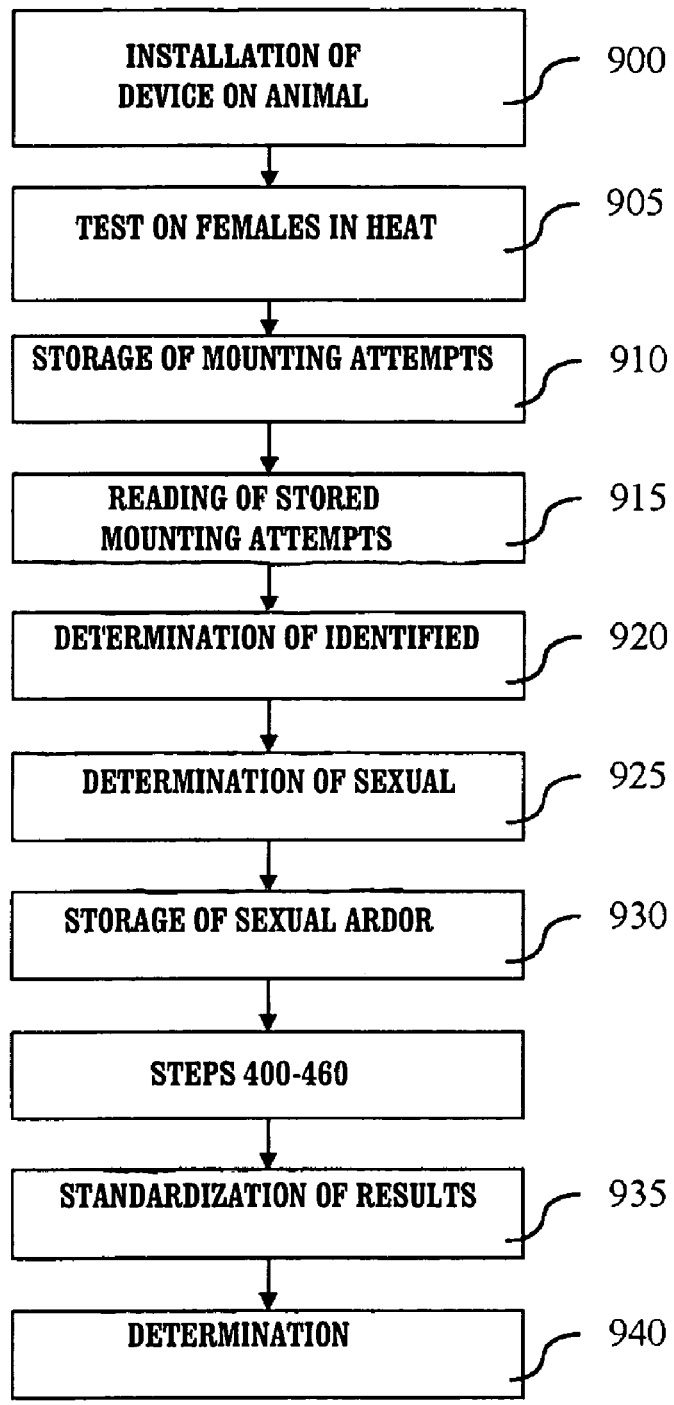
FIG. 9 represents a schematic view of a succession of steps carried out in a particular way of implementing the process which is the subject of the present invention.

FIG. 9 shows a calibration phase of the animal 700 wearing the device 710. During this step 900 the device 710 is attached to the animal 700 as indicated above. During a step 905 the animal is placed for a predetermined length of time, 15 minutes for example, in the presence of a small number of females that are certain to be in heat. In this test which exists to evaluate the libido of the rams, the ewes are few in number and they are removed once they have been mounted by the ram. In this manner one gets an idea of the ram's libido. The ram is placed in the presence of five to six ewes: if after 15 minutes in the presence of ewes in heat he has not detected anything, he is not usable. Inversely, if he mounts all of them and very quickly, he is given a high score.

The device 710 memorizes, as indicated above, the mounting attempts of the animal 700, step 910. Then, with the base-station, the memory 760 of the device 710 is read, step 915. During a step 920, it is determined which females have experienced the mounting attempts and at what frequency.

During a step 925, based on the initial knowledge of the identity of the females that are effectively in heat, the capacity of the animal 700 to detect the females in heat and the sexual ardor of this animal 700 are determined.

If the animal 700 is sufficiently reliable, his sexual ardor is stored in the memory 755 of the device 710 or, preferably, in a data base of the computer system that ultimately processes the data read in the memory of the device 760 of the device 710, step 930.

Then the steps 400 to 460 shown in FIG. 4 are carried out.

During the analysis of the data read in the memory 760, steps 935, the results obtained with the animal 700 based on his memorized sexual ardor are standardized. On the basis of the standardized results one determines those of the females 720 that are in heat, step 940, by detecting the identifiers of the females having experienced a number of mounting attempts higher than a predetermined value.

Each of the versions of the invention illustrated above may incorporate characteristics of other versions of the invention.

In conformance with each of the aspects of the present invention, a very small number of animals do wear portable readers: the detecting animals (males, castrated or not, or androgenized females). In the versions illustrated in FIGS. 1 to 4, given that all females of the herd are equipped with an official permanent transponder, they are potentially all detectable all the time. Furthermore, the process and devices which are the subject of the present invention make use of the male-female behavior which is far more selective than the female-female behavior. As a matter of fact, cows in heat accept being mounted but they also attempt to mount the other cows (not in heat).

As a variant, the present invention can be used for the detection of bellicose behavior among males of a same species (selection of fighting bulls, in this case the transponder-bearing ear tag would be concerned) or for the remote identification of animals: a dog equipped with the device and that obeys his master places himself in proximity of an animal that has been pointed out to him, the proximity of the dog and the target animal activating a reading of the animal's identity. Finally, for ethological studies of domestic or wild animals that would have been identified previously, studies on the proximity of animals to each other could be performed in accordance with predefined rules for activation.

I claim:

1. A device for automated detection of attempts to mate a first, female animal by a second, detecting animal, said device comprising:
    an electronic tag configured to be placed in or fixed at an organ of the female animal, the electronic tag being a passive tag without any source of energy and generating a signal only upon detector-activation, the electronic tag not generating signals until being detector-activated by the detecting animal making a mounting attempt on the female animal by the detecting animal being on top of the female animal;
    a detector configured for emitting an electromagnetic field activating said electronic tag when said electronic tag is located in or fixed at the organ of the female animal and said detector is attached on the detecting animal,
    the electronic tag being detector-activated by the detecting animal being on top of the female animal so that the detector establishes a communication with the electronic tag worn by the female animal, wherein upon being activated, said electronic tag emits an identification of said female animal in an identifying signal modulating the electromagnetic field and picked up by the detector, said detector comprising an identifier configured for identifying said passive electronic tag based on the identification within the identifying signal emitted by the electronic tag; and a fastener configured for attaching said detector on the detecting animal in a position to ascertain that the mounting attempt occurred.

2. The device of as per claim 1, wherein said electronic tag comprises a support configured to be placed in a digestive tract of the female animal.

3. The device of as per claim 1, wherein said detector comprises a memory configured to store the identification based on the detecting animal mounting the female animal.

4. The device of as per claim 1, wherein,
said electronic tag is an RFID tag and the identification is a unique identifier which identifies the first, female animal, and
said detector is an RFID reader.

5. The device of as per claim 1, wherein said detector is configured for writing data, the data read from said electronic tag during the mounting attempt, onto said detector.

6. The device of as per claim 1, wherein said fastener comprises a harness holding in place said detector, said detector comprising an antenna to receive signals emitted by said electronic tag during a mounting attempt.

7. The device of as per claim 1, further comprising a verticality sensor configured to activate the said detector.

8. The device of as per claim 1, further comprising a pressure sensor configured to sense pressure exerted on the back of said female animal, said pressure sensor configured to be placed under the belly of the detecting animal wearing the detector, to activate the said detector.

9. The device of as per claim 1, further comprising a temperature sensor, said temperature sensor configured to be placed under the belly of the detecting animal wearing the detector, to activate the said detector.

10. The device of as per claim 1, further comprising a motion sensor, movements of the detecting animal wearing the device being sensed to activate the said detector.

11. The device of as per claim 1, wherein said identifier comprises an image processing part for identification of the female animal.

12. The device of as per claim 1, wherein said detector is configured for determining time and date of each mounting of the female animal by the detecting animal.

13. The device of as per claim 1, wherein,
said electronic tag is an RFID tag retaining a unique identifier which identifies the female animal,
said detector comprising an antenna configured for emitting the electromagnetic field toward the RFID tag for stimulating the RFID tag, a controller, a program memory, a communication interface (175), and a communication module, and
further comprising a mounting sensor configured to activate said detector.

14. The device of as per claim 13, wherein the mounting sensor is a pressure sensor configured for placing under the belly of the detecting animal.

15. The device of as per claim 13, wherein the mounting sensor is a verticality sensor.

16. The device of as per claim 13, wherein the mounting sensor is a motion sensor.

17. The device of as per claim 1, wherein said electronic tag comprises a support configured to be fixed at the ear of the female animal.

18. The device of claim 1, wherein said electronic tag comprises a ruminal bolus configured to be placed in a digestive tract of the female animal.

19. The device of claim 18, wherein said ruminal bolus comprises a ceramic cylinder.

20. A device for automated detection of attempts to mate a first, female animal by a second, detecting animal, said device comprising:
an RFID electronic tag configured to be placed in or on an organ of the female animal;
an RFID detector configured for emitting an electromagnetic field stimulating said electronic tag when said electronic tag is located in the organ of the female animal and said detector is attached on the detecting animal, wherein upon being stimulated, said electronic tag emits an identification of said female animal in an identifying signal picked up by the detector, said detector comprising an identifier configured for identifying said passive electronic tag based on the identification within the identifying signal emitted by the electronic tag;
a mounting sensor arranged to activate said detector; and
a fastener configured for attaching said detector on the detecting animal.

* * * * *

UNITED STATES PATENT AND TRADEMARK OFFICE
CERTIFICATE OF CORRECTION

| | | |
|---|---|---|
| PATENT NO. | : 7,992,521 B2 | Page 1 of 1 |
| APPLICATION NO. | : 10/583499 | |
| DATED | : August 9, 2011 | |
| INVENTOR(S) | : Francois Bocquier | |

It is certified that error appears in the above-identified patent and that said Letters Patent is hereby corrected as shown below:

On the title page, please amend Item (73) to read as follows:

--(73) Assignee: Centre International d'Etudes Superieures en Sciences Agronomiques de Montpellier (Montpellier Supagro), Montpellier, (FR); Institut National de la Rechereche Agronomique (I.N.R.A.), Paris (FR)--

Signed and Sealed this
Tenth Day of January, 2012

David J. Kappos
*Director of the United States Patent and Trademark Office*